Jan. 6, 1925.                    1,521,688
E. F. HURT ET AL
PONY TRUCK ATTACHMENT
Filed April 28, 1924
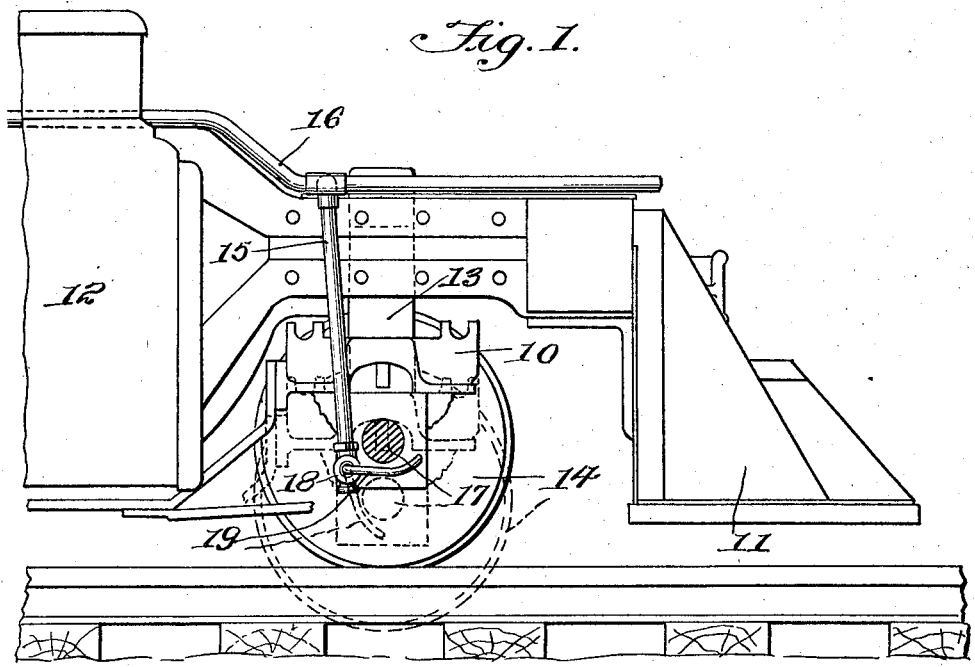
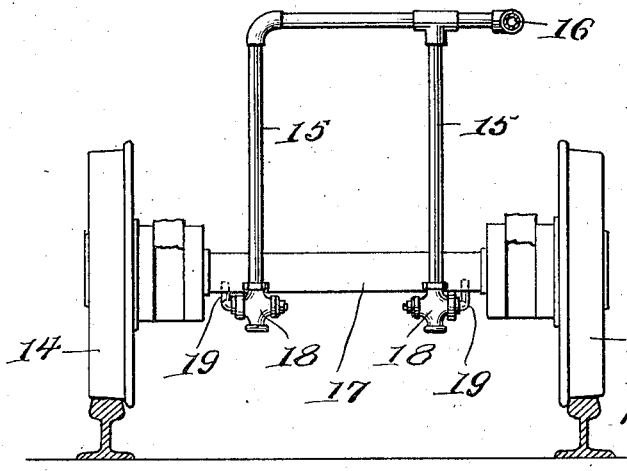
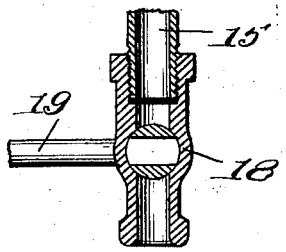
Erastus F. Hurt.
Percy O Simmons
INVENTORS
BY Victor J. Evans
ATTORNEY
WITNESS: J. F. L. Wright Patented Jan. 6, 1925.

1,521,688

UNITED STATES PATENT OFFICE.

ERASTUS F. HURT AND PERCY O. SIMMONS, OF HINTON, WEST VIRGINIA.

PONY-TRUCK ATTACHMENT.

Application filed April 28, 1924. Serial No. 709,537.

*To all whom it may concern:*

Be it known that we, ERASTUS F. HURT and PERCY O. SIMMONS, citizens of the United States residing at Hinton, in the county of Summers and State of West Virginia, have invented new and useful Improvements in Pony-Truck Attachments, of which the following is a specification.

This invention relates to improvements in railway safety devices and has for an object the provision of means which may be attached to a locomotive and arranged so as to be engaged by the axle of the locomotive pony truck to bleed the train line when the wheels of said truck accidentally leave the rails, so as to automatically apply the air brakes.

More specifically stated, the invention aims to provide a pipe or conduit which extends from the air line of the locomotive to a point adjacent the axle of the locomotive pony truck so as to support an air line valve whose stem extends beneath the axle of the pony truck but is normally spaced from the same so that the said valve will normally remain closed, but when the wheels of the pony truck leave the rails the weight of the latter will act upon the valve stem extension to open the valve and bleed the air line.

With the above and other objects in view, the invention further includes the following novel features and details of construction, to be hereinafter more fully described, illustrated in the accompanying drawings and pointed out in the appended claim.

In the drawings:—

Figure 1 is an elevation partly in section showing the invention applied to the pony truck of a locomotive.

Figure 2 is a fragmentary transverse sectional view of the same.

Figure 3 is an enlarged section of the valve.

Referring to the drawing in detail wherein like characters of reference denote corresponding parts, the invention is shown as applied to the type of locomotive in which a pony truck 10 is positioned between the cow catcher and boiler 12, the truck being mounted for pivotal movement as shown at 13 and being capable of free vertical movement with respect to the locomotive frame.

Serious accidents have ocurred due to the wheels 14 of the pony truck accidentally leaving the rails, especially in the type of engine where the pony truck is located considerably ahead of the cab so that the engineer does not discover the fact that the pony truck wheels have been derailed until an accident occurs.

In order to provide means for automatically applying the air brakes to stop the locomotive as soon as the wheels 14 leave the rails, the present invention provides a pipe 15 which has one end in communication with a locomotive air line 16 and its opposite end located adjacent the axle 17 of the pony truck. The pipes 15 are preferably duplicated upon opposite sides of the locomotive frame so that they are arranged upon opposite sides of the center of the axle 17 and each pipe 15 carries at its lower end a valve 18. The stems of the valves 18 have extending therefrom right angularly arranged arms 19 which are located beneath the axle 17, so that if the wheels 14 accidentally leave the rails the axle will engage the arms 19 to open the valve 18 and bleed the air line. The brakes will then be automatically applied.

The invention is susceptible of various changes in its form, proportions and minor details of construction and the right is herein reserved to make such changes as properly fall within the scope of the appended claim.

Having described the invention what is claimed is:—

The combination with the vertically movable pony truck of a locomotive, of a pipe having one end in communication with the locomotive air line and its opposite end located adjacent the axle of the locomotive, a normally closed valve in the last mentioned end of said pipe and an arm extending from the stem of the valve beneath said axle whereby should the wheels of the pony truck leave the rails, the axle of said truck will engage and depress the arm to open the valve and bleed the train line.

In testimony whereof we affix our signatures.

ERASTUS F. HURT.
PERCY O. SIMMONS.